United States Patent
Majhi

(10) Patent No.: US 7,256,056 B2
(45) Date of Patent: Aug. 14, 2007

(54) METHOD AND APPARATUS FOR DETERMINING THE THICKNESS OF A DIELECTRIC LAYER

(75) Inventor: Prashant Majhi, Austin, TX (US)

(73) Assignee: NXP B.V., Eindhoven (NL)

( * ) Notice: Subject to any disclaimer, the term of this patent is extended or adjusted under 35 U.S.C. 154(b) by 125 days.

(21) Appl. No.: 10/552,950

(22) PCT Filed: Apr. 14, 2004

(86) PCT No.: PCT/IB2004/050438

§ 371 (c)(1),
(2), (4) Date: Oct. 13, 2005

(87) PCT Pub. No.: WO2004/092676

PCT Pub. Date: Oct. 28, 2004

(65) Prior Publication Data

US 2006/0214680 A1    Sep. 28, 2006

(30) Foreign Application Priority Data

Apr. 17, 2003    (EP) ................................. 03101051

(51) Int. Cl.
*H01L 21/66* (2006.01)
*G01R 31/26* (2006.01)
(52) U.S. Cl. ........................................ 438/14; 324/765
(58) Field of Classification Search ............. 324/158.1, 324/750, 760, 765; 438/14–18
See application file for complete search history.

(56) References Cited

U.S. PATENT DOCUMENTS

| 4,999,509 A | 3/1991 | Hyakumura et al. | |
| 6,538,462 B1 * | 3/2003 | Lagowski et al. | .......... 324/765 |
| 6,569,691 B1 * | 5/2003 | Jastrzebski et al. | ........... 438/14 |

FOREIGN PATENT DOCUMENTS

WO   WO 02/059631    8/2002

* cited by examiner

*Primary Examiner*—Calvin Lee
(74) *Attorney, Agent, or Firm*—Peter Zawilski

(57) ABSTRACT

The method for determining the thickness of a dielectric layer according to the invention comprises the step of providing an electrically conductive body (11) having a dielectric layer (13) which is separated from the electrically conductive body (11) by at least a further dielectric layer (3) and a surface (15) of which is exposed. Onto the exposed surface (15) an electric charge is deposited, thereby inducing an electric potential difference between the exposed surface (15) and the electrically conductive body (11). An electrical parameter relating to the electric potential difference is determined and a measurement is performed to obtain additional measurement data relating to the thickness of the dielectric layer (13) and/or to the thickness of the further dielectric layer (3). In this way the thickness of the dielectric layer (13) and/or of the further dielectric layer (3) is determined. The method of manufacturing an electric device (100) comprises this method for determining the thickness of a dielectric layer. The apparatus (10) for determining the thickness of a dielectric layer is arranged to execute this method.

9 Claims, 2 Drawing Sheets

METHOD AND APPARATUS FOR DETERMINING THE THICKNESS OF A DIELECTRIC LAYER

Figure 1:
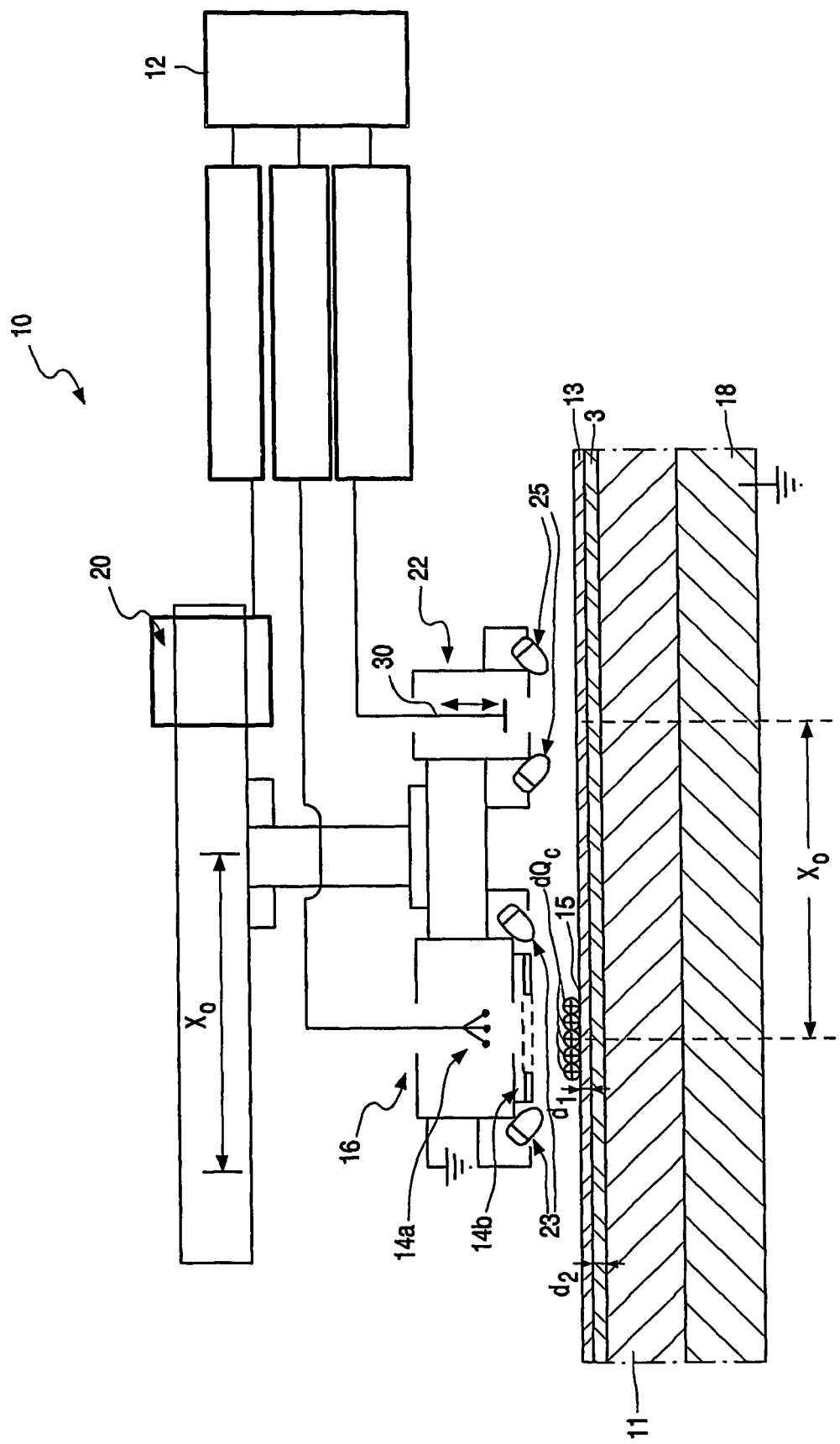

This application is a 371 of PCT/IB04/50438, filed Apr. 14, 2004, and claims priority from EPO No. 03101051.5, filed Apr. 17, 2003; the contents of which are incorporated herein by reference in their entirety.

The invention relates to a method for determining the thickness of a dielectric layer comprising the steps of providing an electrically conductive body having a dielectric layer, a surface of the dielectric layer being exposed, depositing an electric charge onto the exposed surface thereby inducing an electric potential difference between the exposed surface and the electrically conductive body, determining an electric parameter relating to the electric potential difference, and deriving the dielectric layer thickness from the electrical parameter.

The invention further relates to a method for manufacturing an electric device in which such a method is performed.

The invention relates further to an apparatus for determining the dielectric layer thickness according to such a method.

WO 02/059631 discloses a method for determining the thickness of a dielectric layer as described in the opening paragraph.

In the known method, an electric charge $dQ_C$ is deposited onto the exposed surface of the dielectric layer. Due to the deposited electric charge $dQ_C$ an electric potential difference $dV$ between the exposed surface and the electrically conductive body is induced. An electrical parameter relating to this electric potential difference is determined by a Kelvin probe or a Monroe probe and subsequently the thickness of the dielectric layer is determined from the electrical parameter. The electrical parameter may be the electric potential difference $dV$ itself or alternatively, e.g., a leakage current through the dielectric layer. The leakage current may be time-dependent.

It is a disadvantage of the known method that the thickness of the dielectric layer cannot be determined when the dielectric layer is separated from the electrically conductive body by at least one further dielectric layer.

It is an object of the invention to provide a method which is suited to determine the thickness of the dielectric layer when the dielectric layer is separated from the electrically conductive body by at least one further dielectric layer.

The invention is defined by the independent claims. The dependent claims define advantageous embodiments.

The invention is based on the insight that in the known method the thickness $d_1$ of the dielectric layer cannot be determined when the dielectric layer is separated from the electrically conductive body by at least one further dielectric layer because the electrical parameter then is a function of the thickness $d_1$ and the thickness $d_2$ of the at least one further dielectric layer. In the remainder of this document the at least one further dielectric layer is often referred to simply as the further dielectric layer. When the at least one further dielectric layer comprises more than one layer, the thickness $d_2$ comprises the thickness of each of these layers. By performing the measurement, measurement data being a further function of the thickness $d_2$ are obtained. The measurement data may additionally depend on the thickness $d_1$ as well provided that the dielectric layer thickness, which is selected from the thickness $d_1$ and the thickness $d_2$, is derivable from the electric potential difference and the measurement data. This implies that the electrical parameter and the measurement data have different functional dependencies on the thickness $d_1$ and the thickness $d_2$ such that at least one of the unknowns, i.e. the thickness $d_1$ and/or the thickness $d_2$, can be determined from the electrical parameter and the measurement data.

The measurement may comprise, e.g., a mechanical, optical or electrical measurement of the thickness $d_1$, the thickness $d_2$ or the thickness $d_1$ plus the thickness $d_2$.

In the method according to the invention the electrically conductive body may comprise, e.g., metals, metal alloys, semiconductors or layers of these materials. The dielectric layer and the further dielectric layer may comprise any type of electrically insulating material such as, e.g., silicon oxide, silicon nitride, tantalum oxide, aluminum oxide, barium strontium titanium or hafnium oxide.

The method according to the invention is further suited for determining the thickness $d_2$ instead of or in addition to determining the thickness $d_1$.

The method according to the invention is particularly useful for dielectric layers having a relatively small thickness of, e.g., 10 nm or less. In particular for layers of such small thickness alternative techniques are often not reliable and/or not accurate.

In an embodiment the dielectric layer has a dielectric constant $\epsilon_1$, the further dielectric layer has a further dielectric constant $\epsilon_2$, and the dielectric layer thickness, e.g. the thickness $d_1$, is determined from the thickness $d_2$, the dielectric constant $\epsilon_1$, the further dielectric constant $\epsilon_2$, the electric charge $dQ_C$ and the electric potential difference $dV$. Neglecting current leakage through the dielectric layer and the further dielectric layer, $dV$ as a function of $dQ_C$, which is also referred to as the Q-V relationship, is used to derive the equivalent capacitance density $C/A$, i.e. the capacitance $C$ per area $A$. From the equivalent capacitance, density $C/A$ the thickness $d_1$ is derivable by using the formula $\epsilon_0 A/C = (d_1/\epsilon_1 + d_2/\epsilon_2)$, where $\epsilon_0$ denotes the permittivity of free space. When the further dielectric layer comprises a stack of n layers, where n is an integer larger than one, each of the layers having a thickness $d_{i+1}$ with a dielectric constant $\epsilon_{i+1}$, where i is a positive integer smaller than or equal to n, the term $d_2/\epsilon_2$ in the above formula is replaced by the sum of all terms $d_i/\epsilon_i$. When current leakage through the dielectric layer and the further dielectric layer cannot be neglected, the electric potential difference depends on time. In this case the thickness $d_1$ can be determined from, e.g., the measured electric potential difference as a function of time by analyzing it analogously to the known method.

Alternatively, in particular in cases where the thickness $d_2$ is not readily available, other methods of performing the measurement may be advantageous which may be based on, e.g., the spectral reflectance of the dielectric layer and/or of the further dielectric layer. This method of determining the thickness $d_1$ and the thickness $d_2$ by measuring the spectral reflectance is known from, e.g., U.S. Pat. No. 4,999,509. It involves measuring the spectral reflectance, i.e. the ratio of the reflected light intensity and the incident light intensity as a function of the wavelength. The measurement data thus obtained are then analyzed using an optimization procedure the outcome of which at least partly depends on the initial parameters used in the optimization procedure. Therefore, this technique alone is often not sufficiently reliable and/or accurate, in particular when the dielectric layer and the further dielectric layer are relatively thin, e.g. having a thickness of less than 50 nm such as, e.g. 2 to 10 nm, or when the further dielectric layer and the electrically conductive body are separated by an additional dielectric layer. When this method is used in combination with the known method, the electrical parameter imposes a constraint during the optimization procedure, thereby largely reducing the above-mentioned dependency on the initial parameters used in the optimization procedure.

It is often advantageous if after depositing the electric charge $dQ_C$ and determining the electrical parameter, and prior to performing the measurement, the dielectric layer is at least partly removed to expose a further surface of the further dielectric layer. When the further dielectric layer comprises more than one layer, the upper of these layers, i.e. the layer in direct contact with the dielectric layer, is exposed. In this way it is possible to perform the measurement on the exposed part of the further dielectric layer, i.e. at a position where the dielectric layer is absent. As a consequence, the measurement data relate to a relatively small extent to the thickness $d_1$, allowing for a computationally relatively easy determination of the thickness $d_1$. When partly removing the dielectric layer, it is preferred that the measurement data relate to the thickness $d_1$ as little as possible, i.e. not at all.

In this case it is further advantageous if the thickness $d_2$ of the exposed part of the further dielectric layer remains substantially constant during the step of at least partly removing the dielectric layer because the measurement data then directly relate to the thickness $d_2$. When a part of the further dielectric layer is removed as well during the step of at least partly removing the dielectric layer, the remaining exposed further dielectric layer is thinner than the further dielectric layer when determining the electrical parameter. For a reliable determination of the thickness $d_1$ this reduction of the thickness $d_2$ has to be taken into account which complicates the execution of the method according to the invention.

In many cases it is advantageous if the step of at least partly removing the dielectric layer comprises an etching step because for many material combinations etching recipes are known which allow for selectively removing at least part of the dielectric layer while keeping the thickness $d_2$ substantially unchanged.

When at least partly removing the dielectric layer to at least partly expose the further dielectric layer it is further advantageous if performing the measurement comprises the sub-steps of depositing a further electric charge onto the further exposed surface, thereby inducing a further electric potential difference between the further exposed surface and the electrically conductive body, and determining a further electrical parameter relating to the further electric potential difference, the measurement data comprising the further electrical parameter. In this embodiment of the method according to the invention the thickness $d_2$ of the exposed further dielectric layer is determined in a way analogous to the known method which has the advantage that the thickness $d_2$ is determined relatively accurately, in particular when the thickness $d_2$ is relatively small, e.g. below 50 nm. For such a relatively small thickness alternative methods often do not have the required accuracy.

In another embodiment of the method according to the invention the electrically conductive body and the further dielectric layer are separated by an additional dielectric layer, i.e. the dielectric layer, the further dielectric layer and the additional dielectric layer initially form a stack, and the measurement data relate to a thickness $d_3$ of the additional dielectric layer. When leakage currents through the dielectric layer, the further dielectric layer and the additional dielectric layer can be neglected, the thickness $d_1$ is readily derivable from the formula $\epsilon_0 \ A/C = (d_1/\epsilon_1 + d_2/\epsilon_2 + d_3/\epsilon_3)$ where $\epsilon_3$ denotes the dielectric constant of the additional dielectric layer and A/C is the inverse of the equivalent capacitance density C/A.

It is often preferred that the thickness $d_2$ and the thickness $d_3$, if present, are determined as well when executing the method according to the invention.

Alternatively, in particular in cases where the thickness $d_2$ and/or the thickness $d_3$ are not readily available, other methods of performing the measurement may be advantageous which may be based on, e.g., the spectral reflectance of the dielectric layer and/or of the further dielectric layer.

In many cases it is advantageous if performing the measurement comprises determining a spectral reflectance of the exposed surface and/or of a further exposed surface of the further dielectric layer. This method is well known in the art and by combining it with the method known from WO 02/059631, the ambiguities in analyzing the data by this method are reduced as explained above. The combination of the method known from WO 02/059631 with the method of determining the spectral reflectance is in particular advantageous when the electrically conductive body and the further dielectric layer are separated by an additional dielectric layer. It is often impossible to use the latter method alone on a stack comprising three or more dielectric layers whereas this is possible using the method according to the invention.

In one embodiment, the spectral reflectance data of the entire stack of the at least three layers are analyzed using the determined electrical parameter as a constraint in the analysis. In another embodiment the dielectric layer is at least partly removed after having determined the electrical parameter, the further dielectric layer is at least partly exposed prior to performing the measurement of the spectral reflectance of the at least partly exposed further dielectric layer. This latter embodiment has the advantage that the analysis of the spectral reflectance data is relatively easy because it involves only two instead of three dielectric layers, i.e. only the further dielectric layer and the additional dielectric layer.

The method for determining the dielectric layer thickness is advantageous when executing a method for manufacturing an electric device comprising an electrically conductive body having a dielectric layer, the dielectric layer being separated from the electrically conductive body by at least one further dielectric layer. The method of manufacturing an electric device comprises the steps of providing the electrically conductive body with the at least one further dielectric layer, providing the at least one further dielectric layer with the dielectric layer, and performing the method for determining the dielectric layer thickness according to the invention for monitoring the steps of providing the electrically conductive body with the at least one further dielectric layer and/or of providing the at least one further dielectric layer with the dielectric layer.

Many electric devices such as, e.g., transistors have a dielectric layer which may be, e.g., a gate dielectric arranged between a semiconducting substrate and a gate electrode, or an inter-gate dielectric arranged between a floating gate and a control gate in a non-volatile memory device. Often, these dielectric layers comprise two or three, sometimes even more, separate layers stacked onto each other. Examples are stacks of layers of silicon oxide and silicon nitride, which are often simply referred to as an ON layer, and of silicon oxide, silicon nitride and silicon oxide, which are often simply referred to as an ONO layer. Other examples are stacks of layers at least one of which comprises a dielectric material having a dielectric constant higher than that of silicon dioxide such as, e.g., tantalum oxide, hafnium oxide, zirconium oxide and aluminum oxide. These materials, which in the art are referred to as high-k materials, often cannot be in direct contact with semiconductors or metals. Therefore, they are often applied in stacks comprising, e.g., a silicon oxide layer interposed between the high-k material and the electrically conductive body.

To obtain a reliable electric device each of the dielectric layers in the stack has to have a thickness within a particular range. During manufacture of electric devices the thickness of each of these layers has to be monitored accurately. It is then preferred that the thickness $d_2$ and the thickness $d_3$, if present, are determined as well when executing the method according to the invention.

Performing the method for determining the dielectric layer thickness according to the invention during the manufacture of an electric device has the advantage that the dielectric layer, the further dielectric layer and the additional dielectric layer, if present, can be formed subsequently in one tool without the need of removing the conductive body after depositing one of the dielectric layers for measurement purposes before forming the subsequent dielectric layer.

According to the invention the dielectric layer thickness may be determined on a separate electrically conductive body such as, e.g. a test wafer which is processed at the same time in the same chamber as one or more other electrically conductive bodies comprising the pre-fabricated electric device. Alternatively, the dielectric layer thickness may be determined on the same electrically conductive body as that which comprises the pre-fabricated electric device. The latter embodiment is preferred in a process in which the electrically conductive bodies are processed one by one, so-called single wafer processing.

The apparatus for determining the dielectric layer thickness according to the method of the invention comprises a charge source for depositing the electric charge, a measuring device for determining the electric parameter relating to the electric potential difference, and a signal processor means for determining the dielectric layer thickness from the electrical parameter and the measurement data. Preferably, the signal processor is arranged to determine the thickness $d_1$, the thickness $d_2$ and the thickness $d_3$, if applicable.

These and other aspects of the method and the apparatus for determining the thickness of the dielectric layer, and of the method for manufacturing an electric device according to the invention will be further elucidated and described with reference to the drawings, in which:

FIG. 1 is a schematic drawing of a cross-section of the apparatus for determining the dielectric layer thickness, and FIGS. 2A-2D are cross-sections of the electrically conducting body at various steps of an embodiment of the method for manufacturing the electric device.

The Figures are not drawn to scale. In general, identical components are denoted by the same reference numerals.

The method for determining a dielectric layer thickness comprises the steps of providing an electrically conductive body 11 shown in FIG. 1 which may be, e.g., a silicon wafer, a silicon on insulator wafer or a gallium arsenic wafer. The electrically conductive body 11 is held by and electrically connected to a conductive vacuum chuck 18 which is electrically connected to ground potential. The electrically conductive body 11 has a dielectric layer 13 which may be composed of any type of electrically insulating material such as, e.g., silicon oxide, silicon nitride, tantalum oxide, aluminum oxide, hafnium silicate, zirconium oxide, lanthanum oxide, praseodymium oxide ($Pr_2O_3$), barium strontium titanium or hafnium oxide. The dielectric layer 13 is separated from the electrically conductive body 11 by at least one further dielectric layer 3 which may be composed of any type of electrically insulating material such as, e.g., the materials mentioned above in relation to dielectric layer 13. The dielectric layer 13 has a surface 15 which is exposed.

In a step of the method according to the invention an electric charge $dQ_C$ is deposited onto the exposed surface 15, thereby inducing an electric potential difference dV between the exposed surface 15 and the electrically conductive body 11. The electric potential difference dV is a function of the thickness $d_1$ of the dielectric layer 13 and the thickness $d_2$ of the further dielectric layer 3.

The apparatus 10 for determining the dielectric layer thickness shown in FIG. 1 is similar to that shown in FIG. 1 of WO 02/059631. It comprises a charge source 16 for depositing the electric charge $dQ_C$. The charge source 16 may be, e.g., a corona discharge source including a corona charging wire 14a which receives a high voltage potential of either a positive or negative polarity and a corona-confining electrode ring 14b, e.g., a metal ring, held at ground potential or a bias. Preferably, the charge source 16 is able to deposit the charge $dQ_C$ uniformly on the surface 15 of the dielectric layer 13, preferably within a radius of about 6 to about 10 mm. The corona discharge source is able to produce a controlled ionic discharge flux (ionic) current suitable for depositing the electric charge $dQ_C$. The flux may be adjustable and range, e.g., from about $10^{-6}$ to about $5 \times 10^{-6}$ A cm$^{-2}$.

Preferably, the amount of the deposited charge $dQ_C$ is relatively small, e.g. determined by the above-specified flux which is deposited during less than, e.g., 30 seconds. In this way the amount of charged traps generated in the dielectric layer 13 and the further dielectric layer 3 due to the current leakage is reduced which enhances the accuracy of the method. The amount of the electric charge $dQ_C$ deposited may be controlled by adjusting the high voltage potential, the height of the corona electrode above the wafer, and/or the bias voltage applied between the corona charging wire 14a and the ion flux confining electrode 14b. The charge source 16 is able to deposit either a positive or a negative charge on the surface 15. Preferably, the charge source 16 charges the surface 15 with a positive corona discharge because a negative corona discharge is more difficult to control with respect to charging uniformity.

In a subsequent step an electric parameter relating to the electric potential difference dV due to the deposition of the electric charge $dQ_C$ is determined. To this end the apparatus 10 further comprises a measuring device 22 for determining the electrical parameter relating to the potential difference dV. The potential measuring device 22 may be, e.g., a Kelvin probe or a Monroe-type probe. It is able to determine the electric potential difference dV by measuring the contact potential of dielectric layer 13 with respect to a reference electrode 30. Sensors of these types are described, e.g., in the references stated in WO 02/059631, page 9, line 28-31. Typically, the electrode 30 is separated from the top surface of the dielectric film 13 by an air gap of about a fraction of about a millimeter. Charge source 16 and measuring device 22 are spaced apart from each other on a mount at a fixed distance $x_0$ of, e.g., 2 cm, between their centers. After depositing charge $dQ_C$ on surface 15, solenoid 20 is used to translate charge source 16 and measuring device 22 by a distance $x_0$ such that the measuring device 22 is above the surface 15 previously provided with the electric charge $dQ_C$.

When the electrically conductive body 11 is a semiconductor, the change of the contact potential V measured by the vibrating Kelvin or Monroe electrode is not solely determined by the electric potential difference dV caused by the deposited electric charge $dQ_C$, but is equal to the change in voltage drop across the dielectric layer dV plus the change in the semiconductor surface barrier, $V_{SB}$, i.e. $V=dV+V_{SB}$. Preferably, the apparatus 10 further comprises light sources 23, 25, preferably green or blue light emitting diodes, to illuminate testing site 15 during charging (light source 23) and during measuring (light source 25), thereby reducing the value of $V_{SB}$ by collapsing the surface depletion region in case the electrically conducting body 11 is a semiconductor.

The apparatus 10 further comprises a signal processing device 12 which is a computer arranged to receive a signal relating to the electric potential difference. The signal processing device 12 is further arranged to control the high voltage of the charge source 16 and the solenoid 20.

After determination of the electrical parameter relating to the electric potential difference dV, the dielectric layer 13 is removed to expose a further surface of the further dielectric layer 3 by an etching step. In one embodiment the dielectric layer 13 is composed of silicon nitride, the further dielectric layer 3 is composed of silicon dioxide and the etching step comprises a wet etch in which phosphoric acid, $H_3PO_4$, is used as the etching agent. Such an etching process is selective towards silicon nitride, i.e. silicon nitride is removed more effectively than silicon dioxide. The selectivity is improved by heating the etching agent and is usually greater than 25:1. Therefore, the thickness of the exposed part of the further dielectric layer is kept substantially constant during the step of at least partly removing the dielectric layer.

The electrically conductive body 11 thus obtained has only the further dielectric layer 3. In a subsequent step of the method according to the invention a measurement is performed for obtaining measurement data being a further function of the thickness of the at least one further dielectric layer 3. Performing the measurement comprises the substeps of depositing a further electric charge $dQ_{CF}$ onto a further exposed surface of the further dielectric layer 3, thereby inducing a further electric potential difference $dV_F$ between the further exposed surface and the electrically conductive body 11 using the apparatus 10 in an analogous way, followed by determining a further electrical parameter relating to the further electric potential difference $dV_F$.

The further electric charge $dQ_{CF}$ is deposited by charge source 16 and the further electric potential difference $dV_F$ is determined by the measuring device 22 in way analogous to that described above. The signal processing device 12 is further arranged to receive a further signal relating to the measurement data, and to determine the dielectric layer thickness from the signal and the further signal.

In this embodiment the electrical parameter comprises the electric potential difference dV, the measurement data comprises the further electric potential difference $dV_F$, and the dielectric layer thickness is derived from the electrical parameter and the measurement data, said dielectric layer thickness being selected from the thickness $d_1$ of the dielectric layer 13 and the thickness $d_2$ of the at least one further dielectric layer 3. The dielectric layer 13 has a dielectric constant $\epsilon_1$, the further dielectric layer 3 has a further dielectric constant $\epsilon_2$, and the thickness $d_1$ of the dielectric layer 13 is determined from the thickness $d_2$ of the further dielectric layer 3, the dielectric constant $\epsilon_1$, the further dielectric constant $\epsilon_2$, the electric charge $dQ_C$ and the electrical potential difference dV. To this end, the thickness $d_2$ of the further dielectric layer 3 is determined from the further electric potential difference $dV_F$ and the further electric charge $dQ_{CF}$ according to the formula go $A/C_F=d_2/\epsilon_2$, where $\epsilon_0$ denotes the permittivity of free space and $A/C_F$ is the inverse of the equivalent capacitance density derived from $dV_F$ as a function of $dQ_{CF}$. Subsequently, the thickness $d_1$ of the dielectric layer 13 is determined according to the formula $\epsilon_0 A/C=(d_1/\epsilon_1+d_2/\epsilon_2)$, where A/C is the inverse of the equivalent capacitance density derived from dV as a function of $dQ_C$. The signal processing device 12 is arranged to solve these two formulas so as to provide the thickness $d_1$ and the thickness $d_2$.

In an alternative embodiment of the method, performing the measurement comprises determining a spectral reflectance of the exposed surface 15 of the dielectric layer 13. Alternatively, the spectral reflectance may be determined of the further exposed surface of the further dielectric layer 3. In these cases the thickness $d_2$ is determined from the measured spectral reflectance in a way analogous to U.S. Pat. No. 4,999,509.

Figure 2A:
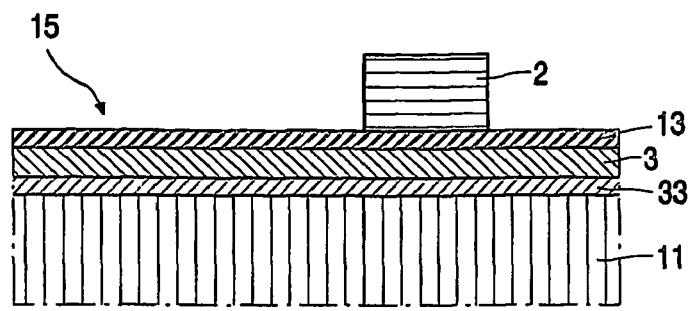
Figure 2B:
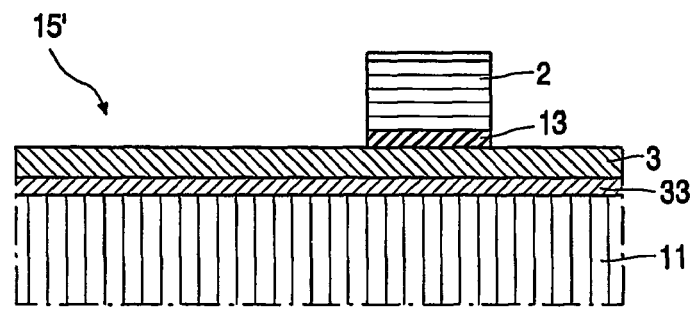
Figure 2C:
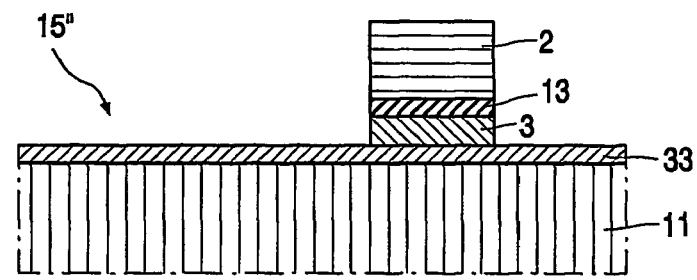

In another embodiment the electrically conductive body 11 and the further dielectric layer 3 are separated by an additional dielectric layer 33 shown in, e.g., FIG. 2A. The method comprises the steps of depositing the electric charge $dQ_C$ on the exposed surface of the dielectric layer 13, determining the electrical parameter relating to the electric potential difference dV, partly removing the dielectric layer 13 to expose the further dielectric layer 3, which results in the structure of FIG. 2B, depositing the further electric charge $dQ_{CF}$ on the exposed surface of the further dielectric layer 3, and determining the further electrical parameter relating to the further electric potential difference $dV_F$, analogous to the embodiment of the method described above. The method further comprises the steps of partly removing the further dielectric layer 3 to expose the additional dielectric layer 33, which results in the structure of FIG. 2C, depositing an additional electric charge $dQ_{CA}$ on the exposed surface of the additional dielectric layer 33, and determining an additional electrical parameter relating to the additional electric potential difference $dV_A$. The measurement data comprise the further electric potential difference $dV_F$ and the additional electric potential difference $dV_A$. The measurement data are a further function of the thickness $d_3$ of the additional dielectric layer 33. The dielectric layer thickness is selected from the thickness $d_1$, the thickness $d_2$ and the thickness $d_3$, and is derived from the electrical parameter and the measurement data via the following formulas: $\epsilon_0 A/C_A=d_3/\epsilon_3$, $A/C_F=(d_2/\epsilon_2+d_3/\epsilon_3)$ and $\epsilon_0 A/C=(d_1/\epsilon_1+d_2/\epsilon_2+d_3/\epsilon_3)$, where $\epsilon_3$ denotes the dielectric constant of the additional layer 33. Here, A/C is the inverse of the equivalent capacitance density derived from dV and $dQ_C$, $A/C_F$ is the inverse of the equivalent capacitance density derived from $dV_F$ and $dQ_{CF}$, and $A/C_A$ is the inverse of the equivalent capacitance density derived from $dV_A$ and $dQ_{CA}$.

In an alternative embodiment of the method, performing the measurement comprises determining a spectral reflectance of the exposed surface 15 of the dielectric layer 13. Alternatively, the spectral reflectance may be determined of the further exposed surface 15' of the further dielectric layer 3 and/or of the additional exposed surface 15" of the additional dielectric layer 33 shown in FIGS. 2B and 2C, respectively. In these cases the thickness $d_2$ and/or the thickness $d_3$ are determined from the measured spectral reflectance in a way analogous to U.S. Pat. No. 4,999,509.

The method of manufacturing an electric device 100 according to the invention comprises the steps of providing the electrically conductive body 11 with the further dielectric layer 3, providing the further dielectric layer 3 with the dielectric layer 13, and performing the method for determining the dielectric layer thickness according to the invention. In the embodiment shown in FIGS. 2A-2D the electrically conductive body 11 is a monocrystalline silicon wafer which prior to providing the further dielectric layer 3 is provided with the additional layer 33. After having provided the dielectric layer 13 the exposed surface is provided with a layer of polycrystalline silicon which is subsequently patterned to form the gate layer 2 shown in FIG. 2A. Subsequently, the method for determining the dielectric layer thickness as described above is performed for monitoring the steps of providing the electrically conductive body 11 with the further dielectric layer 3 and/or of providing the further dielectric layer 3 with the dielectric layer 13. To this end the charge $dQ_C$ is deposited on surface 15 of layer 13 shown in FIG. 2A and the resulting electric potential difference dV is determined. Subsequently, part of the dielectric layer 13 is removed to expose surface 15' of the further dielectric layer 3, shown in FIG. 2B, and the further charge $dQ_{CF}$ is deposited on surface 15' and the resulting further electric potential difference $dV_F$ is determined. In a next step part of the further dielectric layer 3 is removed to expose surface 15" of the additional dielectric layer 33, shown in FIG. 2C, and the further charge $dQ_{CA}$ is deposited on surface 15" and the resulting further electric potential difference $dV_A$ is determined. Finally, the additional dielectric layer 33 is partly removed to expose the electrically conducting body 11, and adjacent to the stack thus formed a source region 50 and a drain region 51 are formed by implanting ions.

Figure 2D:
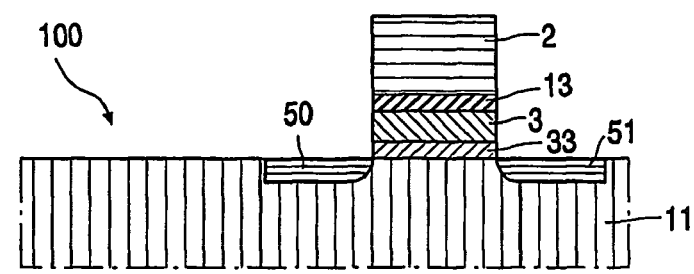

The electric device 100 obtained in this way and shown in FIG. 2D is a transistor. It comprises an electrically conductive body 11 having the dielectric layer 13, the dielectric layer 13 being separated from the electrically conductive body 11 by at least a further dielectric layer 3.

In summary, the method for determining the thickness of a dielectric layer according to the invention comprises the step of providing an electrically conductive body 11 having a dielectric layer 13 which is separated from the electrically conductive body 11 by at least a further dielectric layer 3 and a surface 15 of which is exposed. Onto the exposed surface 15 an electric charge is deposited, thereby inducing an electric potential difference between the exposed surface 15 and the electrically conductive body 11. An electrical parameter relating to the electric potential difference is determined and a measurement is performed to obtain additional measurement data relating to the thickness of the dielectric layer 13 and/or to the thickness of the further dielectric layer 3. In this way the thickness of the dielectric layer 13 and/or of the further dielectric layer 3 is determined. The method of manufacturing an electric device 100 comprises this method for determining the thickness of a dielectric layer. The apparatus 10 for determining the thickness of a dielectric layer is arranged to execute this method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The invention claimed is:

1. A method for determining a dielectric layer thickness, the method comprising the steps of:
   providing an electrically conductive body having a dielectric layer, the dielectric layer being separated from the electrically conductive body by at least one further dielectric layer, a surface of the dielectric layer being exposed,
   depositing an electric charge onto the exposed surface, thereby inducing an electric potential difference between the exposed surface and the electrically conductive body, the electric potential difference being a function of a thickness of the dielectric layer and a thickness of the at least one further dielectric layer,
   determining an electrical parameter relating to the electric potential difference, and
   performing a measurement for obtaining measurement data being a further function of the thickness of the at least one further dielectric layer, the dielectric layer thickness being selected from the thickness of the dielectric layer and the thickness of the at least one further dielectric layer, and
   deriving the dielectric layer thickness from the electrical parameter and the measurement data.

2. A method as claimed in claim 1, wherein the dielectric layer has a dielectric constant, the further dielectric layer has a further dielectric constant, and the dielectric layer thickness is determined from the dielectric constant, the further dielectric constant, the electric charge, the electrical parameter, and the thickness of the dielectric layer or the thickness of the at least one further dielectric layer.

3. A method as claimed in claim 1, wherein after the step of determining the electrical parameter and prior to the step of performing the measurement, the method further comprises the step of at least partly removing the dielectric layer for exposing a further surface of the at least one further dielectric layer.

4. A method as claimed in claim 3, wherein the thickness of the exposed part of the at least one farther dielectric layer is kept substantially constant during the step of at least partly removing the dielectric layer.

5. A method as claimed in claim 3, wherein the step of at least partly removing the dielectric layer comprises an etching step.

6. A method as claimed in claim 3, wherein the step of performing the measurement comprises the sub-steps of:
   depositing a farther electric charge onto the exposed further surface, thereby inducing a further electric potential difference between the farther exposed surface and the electrically conductive body, and
   determining a further electrical parameter relating to the further electric potential difference, the measurement data comprising the further electrical parameter.

7. A method as claimed in claim 3, wherein the step of performing the measurement comprises the step of determining a spectral reflectance of the exposed surface and/or of the further exposed surface.

8. A method as claimed in claim 1, wherein the electrically conductive body and the farther dielectric layer are separated by an additional dielectric layer, the measurement data being a farther function of a thickness of the additional dielectric layer, the dielectric layer thickness being selected from the thickness of the dielectric layer, the thickness of the further dielectric layer and the thickness of the additional dielectric layer, the dielectric layer thickness being derivable from the electric potential difference and the measurement data.

9. An apparatus for determining the dielectric layer thickness according to the method as claimed in claim 1, the apparatus comprising:

a charge source for depositing the electric charge, a measuring device for determining the electrical parameter relating to the electric potential difference, and a signal processing means for determining the dielectric layer thickness from the electrical parameter and the measurement data.

* * * * *